Patented Mar. 14, 1950

2,500,148

UNITED STATES PATENT OFFICE 2,500,148

PREPARATION OF PHENOLPHTHALEIN BETA BETA'-DIGLUCOSIDE OCTAACETATE

Ralph A. Hales, West Chester, Pa., assignor to Atlas Powder Company, Wilmington, Del., a corporation of Delaware No Drawing. Application October 17, 1946, Serial No. 703,705

4 Claims. (Cl. 260—210)

The present invention relates to the preparation of phenolphthalein beta, beta'-diglucoside octaacetate.

An object of the invention is the production of phenolphthalein beta, beta'-diglucoside octaacetate in high yield.

Another object of the invention is the acceleration of the rate of condensation of phenolphthalein with tetraacetylglucosyl bromide.

Other objects will be apparent from the following description.

Phenolphthalein beta, beta'-diglucoside octaacetate has been prepared by coupling tetraacetylglucosyl bromide and phenolphthalein in the presence of silver oxide and organic catalysts such as quinoline. The reaction may be represented by the following equation:

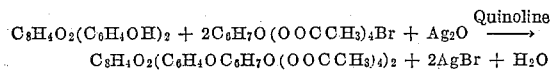

$$C_8H_4O_2(C_6H_4OH)_2 + 2C_6H_7O(OOCCH_3)_4Br + Ag_2O \xrightarrow{\text{Quinoline}}$$
$$C_8H_4O_2(C_6H_4OC_6H_7O(OOCCH_3)_4)_2 + 2AgBr + H_2O$$

It has usually been preferred to conduct this reaction in the presence of materials which remove the water formed during the process.

According to the present invention it has been found that the rate of reaction may be improved if water is added to the reaction mixture.

The beneficial results obtained by the addition of water are observed when as little as about 0.08 mol of water are added per mol of tetraacetylglucosyl bromide and when as much as 25 mols of water are added per mol of tetraacetylglucosyl bromide. However, when the larger amounts of water are employed, there is sometimes a decrease in yield unless the amount of organic catalyst used is increased. A preferred range, as set forth, for example, in Examples 3, 4 and 5 of the table appearing hereinafter, has been found to be between 0.08 mol and 1.11 mols of water per mol of tetraacetylglucosyl bromide.

Some of the added water may be obtained by the use of undried reactants and the elimination of the need for dry reactants is a distinct procedural advantage resulting from the present invention.

In a method for the performance of the reaction, tetraacetylglucosyl bromide, phenolphthalein and silver oxide and the catalytic ingredients are mixed with the solvent for at least one of the reactants. Benzene, monochlorbenzene, and chloroform are examples of suitable solvents. After the other ingredients have been mixed, the desired quantity of water is added. Following the bringing together of the reactants, the reaction takes place spontaneously. Heating the reaction mixture speeds the reaction, but temperatures much above 50° C. usually tend to lower the yield. Temperatures of about 40° C. have been found desirable for practical operation of the process. The completion of the reaction may usually be determined by the absence of soluble bromide in the reaction mixture.

When the silver oxide is employed in wet freshly precipitated condition, it is usually preferable to add it as the last ingredient with stirring to eliminate lumping of the reaction mixture. Ordinarily the silver oxide is employed in some excess and one advantage of using wet silver oxide is that the amount of excess is considerably reduced.

The phenolphthalein beta, beta'-diglucoside octaacetate product may be recovered from the reacted mixture and purified in any convenient manner. One useful method includes filtering the insoluble material, chiefly silver bromide and unreacted silver oxide, from the reaction mixture, removing the solvent by vacuum distillation, digesting the product at elevated temperatures with ethyl alcohol, crystallizing by cooling and stirring, and finally filtering and drying.

In place of or in addition to the quinoline organic catalyst mentioned, such materials as isoquinoline, quinaldine, and lepidine may be employed. Some samples of these organic catalytic materials are, for reasons which are not entirely clear, less active than others, and as has been previously disclosed in application Serial Number 685,769, filed July 23, 1946, now Patent Number 2,450,086, by Ralph A. Hales, for "Chemical process," they may be promoted by materials such as pyridine, alpha picoline, lutidine, and collidine. Or as has been previously disclosed in application Serial Number 694,153, filed August 30, 1946, now Patent Number 2,481,417, by Ralph A. Hales, for "Chemical method," materials such as ethylamine, triethylamine, ethylene diamine, monoethanolamine, monoisopropanolamine, and hydroxyethylethylene diamine are also highly effective promoting materials. Usually alpha picoline is the preferred promoter material, and indeed it may be effectively employed as a sole organic catalyst.

Instead of, or in addition to, activation by the addition of promoter material, quinoline may often be activated by heating, or by storing over caustic soda, or by the use of these expedients jointly.

Silver oxide operates not only as a catalyst but also as a reactant, since it is converted into silver bromide in the process. Silver carbonate may be substituted for silver oxide in the reaction, but loss in yield is sometimes noted when this substitution is made.

The amounts of reacting ingredients may be subject to considerable variation, but, as has been noted, it is usually preferred that the silver catalyst be employed in excess. The reaction is generally assisted if enough solvent is used to keep the reaction mass in thinly fluid condition. The amount of organic catalyst (primary or quinoline type and the promoter type) is also subject to variation both as to total quantity and as to relative proportions. Usually the optimum amounts will vary somewhat with the particular materials employed. In general the total amount of organic catalyst ingredients will not exceed about 50% by weight of the tetraacetylglucosyl bromide employed.

The reaction time is usually shortened by increasing the amount of organic catalyst beyond the minimum amount necessary for maximum yield.

The invention will be further described by means of the specific examples tabulated below.

In each of the examples, to 29.1 grams of tetraacetylglucosyl bromide dissolved in 55 cubic centimeters of benzene were added first quinoline and crude alpha picoline, then 12 grams of silver oxide, then 9.7 grams of phenolphthalein, and finally the amount of water employed, all ingredients being at 25° C. After the water had been added the temperature was raised to 40° C. and the reaction mixture was maintained at this temperature with agitation until a negative test for soluble bromide was obtained.

The specific data for the examples is tabulated below. Included in the added water is the quantity contained in the benzene, quinoline and alpha picoline, none of which were dry. This quantity amounted to about 0.03 mol per mol of tetraacetylglucosyl bromide for each total of 6.0 cubic centimeters of quinoline and 1.5 cubic centimeters of alpha picoline. The other ingredients employed were dry.

To recover and purify the phenolphthalein beta, beta'-diglucoside octaacetate, the insoluble material, chiefly silver bromide and excess silver oxide, was removed by filtration, the filter cake was washed with benzene; and the solvent was essentially removed from the filtrate and wash liquor by vacuum distillation at 65° C. The residue was digested with 100 cubic centimeters of hot denatured ethyl alcohol, cooled, and then stirred for two days at 30° C. The resultant crystalline phenolphthalein beta, beta'-diglucoside octaacetate was then removed by filtration, washed with alcohol and again digested with 350 cubic centimeters of hot denatured ethyl alcohol, cooled and stirred for two days at 30° C. The resultant crystalline materials were filtered, washed with ethyl alcohol and dried at 110° C.

The quinoline employed in these examples could be classed as fairly inactive.

| Example | Quinoline | Crude Alpha Picoline | Mols added Water per Mol of Tetraacetylglucosyl bromide | Yield of Phenolphthalein beta, beta'-diglucoside octaacetate (Per cent of Theory) | Time of Reaction |
|---|---|---|---|---|---|
| | cc. | cc. | | | Hours |
| 1 | 6.0 | 1.5 | 0.03 | 62.8 | 3.0 |
| 2 | 6.0 | 1.5 | 0.06 | 58.7 | 3.0 |
| 3 | 6.0 | 1.5 | 0.09 | 63.4 | 2.0 |
| 4 | 6.0 | 1.5 | 0.14 | 61.7 | 2.0 |
| 5 | 6.0 | 1.5 | 1.11 | 58.2 | 1.5 |
| 6 | 6.0 | 1.5 | 10.8 | 49.4 | 1.5 |
| 7 | 6.0 | 1.5 | 21.5 | 50.0 | 1.5 |
| 8 | 12.0 | 3.0 | 21.5 | 61.8 | 1.5 |

What is claimed is:

1. In a process for the preparation of phenolphthalein beta beta'-diglucoside octaacetate by the reaction of phenolphthalein and tetraacetylglucosyl bromide in a solvent and in the presence of organic catalytic materials and a catalyst selected from the class consisting of silver oxide and silver carbonate, the improvement which comprises adding to the reaction mixture at the start of the reaction between about 0.08 and 1.11 mols of water per mol of tetraacetylglucosyl bromide.

2. In a process for the preparation of phenolphthalein beta, beta'-diglucoside octaacetate by the reaction of phenolphthalein and tetraacetylglucosyl bromide in a solvent and in the presence of a catalyst selected from the group consisting of silver oxide and silver carbonate and another catalyst selected from the group consisting of quinoline, isoquinoline, quinaldine, and lepidine, the improvement which comprises adding to the reaction mixture at the start of the reaction between about 0.08 and 1.11 mols of water per mol of tetraacetylglucosyl bromide.

3. In a process for the preparation of phenolphthalein beta, beta'-diglucoside octaacetate by the reaction of phenolphthalein and tetraacetylglucosyl bromide in a solvent and in the presence of a catalyst selected from the group consisting of silver oxide and silver carbonate and another catalyst selected from the group consisting of quinoline, isoquinoline, quinaldine, and lepidine, said other catalysts further including an added substance selected from the group consisting of pyridine, alpha picoline, lutidine, collidine, ethylamine, triethylamine, ethylenediamine, monoethanolamine, monoisopropanolamine, and hydroxyethylethylene diamine, the improvement which comprises adding to the reaction mixture at the start of the reaction between 0.08 and 1.11 mols of water per mol of tetraacetylglucosyl bromide.

4. The process which comprises first forming a reaction mixture of phenolphthalein, tetraacetylglucosyl bromide, silver oxide, quinoline, alpha picoline, and from about 0.08 to 1.11 mols of water per mole of tetraacetylglucosyl bromide, and thereafter reacting the phenolphthalein and tetraacetylglucosyl bromide in said mixture to form phenolphthalein beta, beta'-diglucoside octaacetate.

RALPH A. HALES.

REFERENCES CITED

The following references are of record in the file of this patent:

UNITED STATES PATENTS

| Number | Name | Date |
|---|---|---|
| 2,216,734 | Cairncross | Oct. 8, 1940 |